United States Patent
Wu

(10) Patent No.: US 10,668,423 B2
(45) Date of Patent: Jun. 2, 2020

(54) AIR CLEANING MACHINE

(71) Applicant: BLUESEA CO., LTD., Taipei (TW)

(72) Inventor: Jian-Ming Wu, Taipei (TW)

(73) Assignee: BLUESEA CO., LTD., Taipei (TW)

( * ) Notice: Subject to any disclaimer, the term of this patent is extended or adjusted under 35 U.S.C. 154(b) by 211 days.

(21) Appl. No.: 15/870,965

(22) Filed: Jan. 14, 2018

(65) Prior Publication Data

US 2018/0214811 A1 Aug. 2, 2018

(30) Foreign Application Priority Data

Jan. 18, 2017 (TW) .............................. 106101611 A

(51) Int. Cl.
| | |
|---|---|
| *B01D 53/04* | (2006.01) |
| *B01D 46/46* | (2006.01) |
| *B01D 46/00* | (2006.01) |
| *B01D 46/44* | (2006.01) |

(52) U.S. Cl.
CPC ......... *B01D 46/46* (2013.01); *B01D 46/0047* (2013.01); *B01D 53/0415* (2013.01); *B01D 53/0423* (2013.01); *B01D 46/442* (2013.01); *B01D 2258/06* (2013.01); *B01D 2259/4508* (2013.01)

(58) Field of Classification Search
CPC ................ B01D 53/04; B01D 53/0415; B01D 53/0423; B01D 46/0047; B01D 46/442; B01D 46/46; B01D 2258/06; B01D 2259/4508
USPC ........ 96/108, 117.5, 147, 414, 109, 111, 413
See application file for complete search history.

(56) References Cited

U.S. PATENT DOCUMENTS

| | | | | |
|---|---|---|---|---|
| 4,210,429 | A * | 7/1980 | Golstein | .................... A61L 9/20 422/121 |
| 4,839,014 | A * | 6/1989 | Park | ...................... B01D 46/00 204/265 |
| 2007/0209701 | A1* | 9/2007 | Lasko | ....................... B03C 3/32 137/15.01 |
| 2013/0019861 | A1* | 1/2013 | Chaudry | .............. A61K 9/0078 128/200.14 |

* cited by examiner

*Primary Examiner* — Frank M Lawrence, Jr.
(74) *Attorney, Agent, or Firm* — Cheng-Ju Chiang

(57) ABSTRACT

Disclosed is an air cleaning machine, which mainly comprises a hollow tube body, a detect chip, an adsorbent material, a large shell body and two air outlet assemblies, the air circulation is formed through a plurality of holes disposed on an underside of the large shell body and a round hole disposed on the side of the large shell body, so the air is able to flow through via an air hole disposed on the one side of the fixing sheet of the hollow tube body. Thus, the detect chip arranged closely to the air hole of the fixing sheet on one side of the hollow tube body can detect the concentration of the suspended particles (PM2.5) in the air.

7 Claims, 5 Drawing Sheets

AIR CLEANING MACHINE

BACKGROUND OF THE INNOVATION PATENT

1. Field of the Innovation Patent

The present innovation patent relates to an air cleaning machine, particularly a device which has an effect of purify the air in the indoor space and decrease the concentration of the suspended particles (PM2.5) in the air, so as to apply to the indoor space or the enclosed space.

2. The Related Arts

In recent years, it has been confirmed that suspended particles (PM2.5) would harm the respiratory system and cardiovascular system of the human body, and it also easily cause asthma, lung cancer, cardiovascular diseases, congenital defect and premature death. Moreover, the suspended particles with a diameter smaller than 2.5 μm (PM2.5) are much easier to adsorb toxic substances, such as heavy metals, toxic microorganisms and so on, than the suspended particles with a diameter between 2.5 μm and 10 μm (PM10). Due to the smaller size, the suspended particles (PM2.5) have better ability to penetrate, and it may reach the bronchial wall and interfere with gas exchange in the lungs. Furthermore, smaller particles (diameters less than or equal to 100 nanometers) are able to affect other organs through the lungs.

Currently, the external air is generally filtered through the central air-conditioner or air-conditioner in the indoor space or enclosed space. However, most of the central air conditioners and air-conditioners can only filter the suspended particles (PM10) with larger surface area, so the suspended particles (PM2.5) with smaller surface area will enter the indoor space or enclosed space through the central air-conditioner or the filter of the air-conditioner, and then float into the indoor space or enclosed space, so the air in the indoor space or enclosed space is easily filled with the suspended particles (PM2.5). Besides, the suspended particles (PM2.5) are not easily floated due to the poor air-circulation, so people in indoor spaces or confined spaces are easily to inhale suspended particles (PM2.5).

Hence, in view of the above problems, the named inventor(s) of the present innovation patent makes painstaking efforts to research and study in cooperation with application of related technical theory and rules. A device, having an effect of purifying the air in the indoor space, which can effectively improve the above mentioned drawbacks and is finally proposed.

SUMMARY OF THE INNOVATION PATENT

The mainly purpose of the present invention is providing an air cleaning machine, which is mainly consisted by a hollow tube body, a detect chip, an adsorbent material, a large shell body and two air outlet assemblies, the air circulation is formed through a plurality of holes being disposed on an underside of the large shell body and a round hole being disposed on the side of the large shell body, so the air is able to flow through via an air hole being disposed on the one side of the fixing sheet of the hollow tube body. Thus, the detect chip being arranged closely to the air hole of the fixing sheet on one side of the hollow tube body can detect the concentration of the suspended particles (PM2.5) in the air. If the concentration of the suspended particles (PM2.5) is too high, a fan of the air outlet assembly will be enabled to make the air flowing via one of the air outlet assembly to the hollow tube body. The suspended particles (PM2.5) in the air is absorbed through the adsorbent material, and then the air is blown out via the other air outlet assembly, so as to achieve an effect of purifying the air in the indoor space and to decrease the concentration of the suspended particles (PM2.5) in the air, which can effectively improve the above mentioned drawbacks and is finally proposed.

The another purpose of the present invention is providing an air cleaning machine, wherein the large shell body further configures two groove tracks disposed on the inner side face, and the width between the two groove tracks is corresponding to the width between the fixing sheets on two sides of the hollow tube body, and the fixing sheets on two sides of the hollow tube body further form an inward bend on the lower side, so as to combine with the two groove tracks on the inner side of the large shell body. In this way, the hollow tube body can be disassembled from the large shell body, so the adsorbent material being disposed in the accommodating space of the hollow tube body can be replaced easily, which is convenient and can effectively improve the above mentioned drawbacks and is finally proposed.

To achieve the purposes mentioned above, the present invention of an air cleaning machine comprises: a hollow tube body having an accommodating space, two sides of the hollow tube body each extends a fixing sheet, and an air hole is disposed on the one side of the fixing sheet; a detect chip is arranged closely to the air hole of the fixing sheet on one side of the hollow tube body; an adsorbent material is disposed in the accommodating space of the hollow tube body; a large shell body is provided for configuring the hollow tube body in the large shell body, two ends of the large shell body being open, a plurality of holes is disposed on an underside of the large shell body, and a round hole is disposed on the side of the large shell body; and two air outlet assemblies are respectively set up on the open side of the two ends of the large shell body, and one of the air outlet assembly is combined with a fan, and one side of the fan is attached to one end of the hollow tube body.

The advantage and features of the present invention will be described below, and as can be appreciated from the above embodiments, a person skilled in the art can achieve the above object. Therefore, the present innovation patent has industry worth which meets the requirement for a patent, so that the application is submitted.

DETAILED DESCRIPTION OF PREFERRED EMBODIMENT

Figure 1:
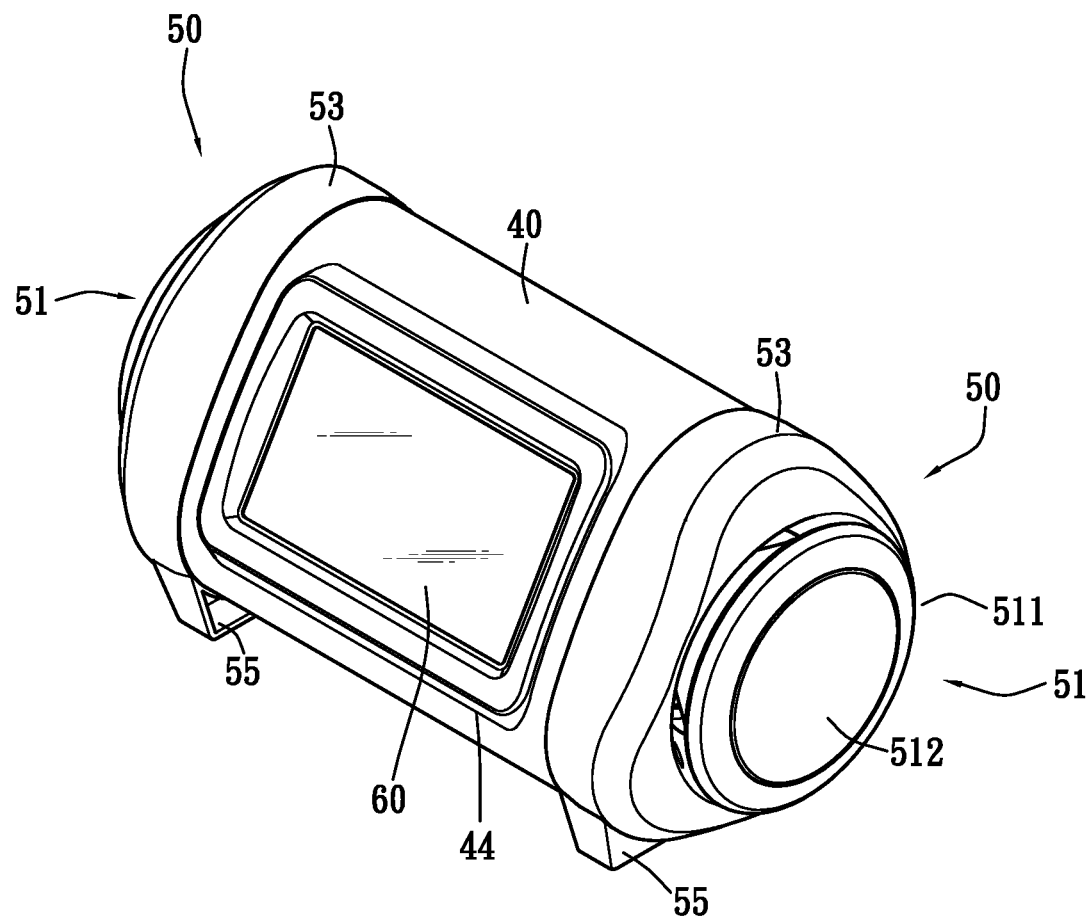
FIG. 1 is a schematic view of the present invention.
Figure 2:
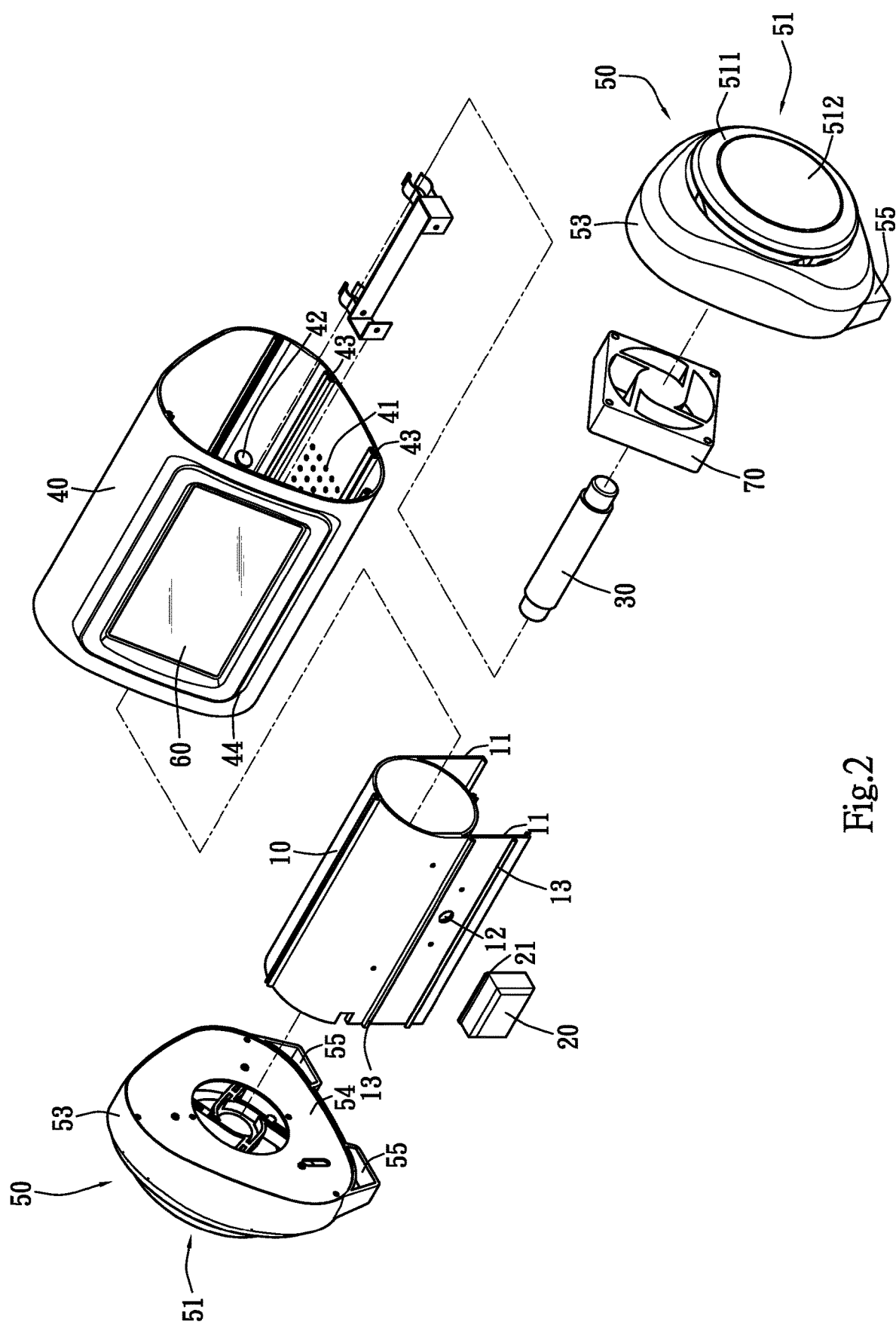
FIG. 2 is an explosion view of the present invention.
Figure 3:
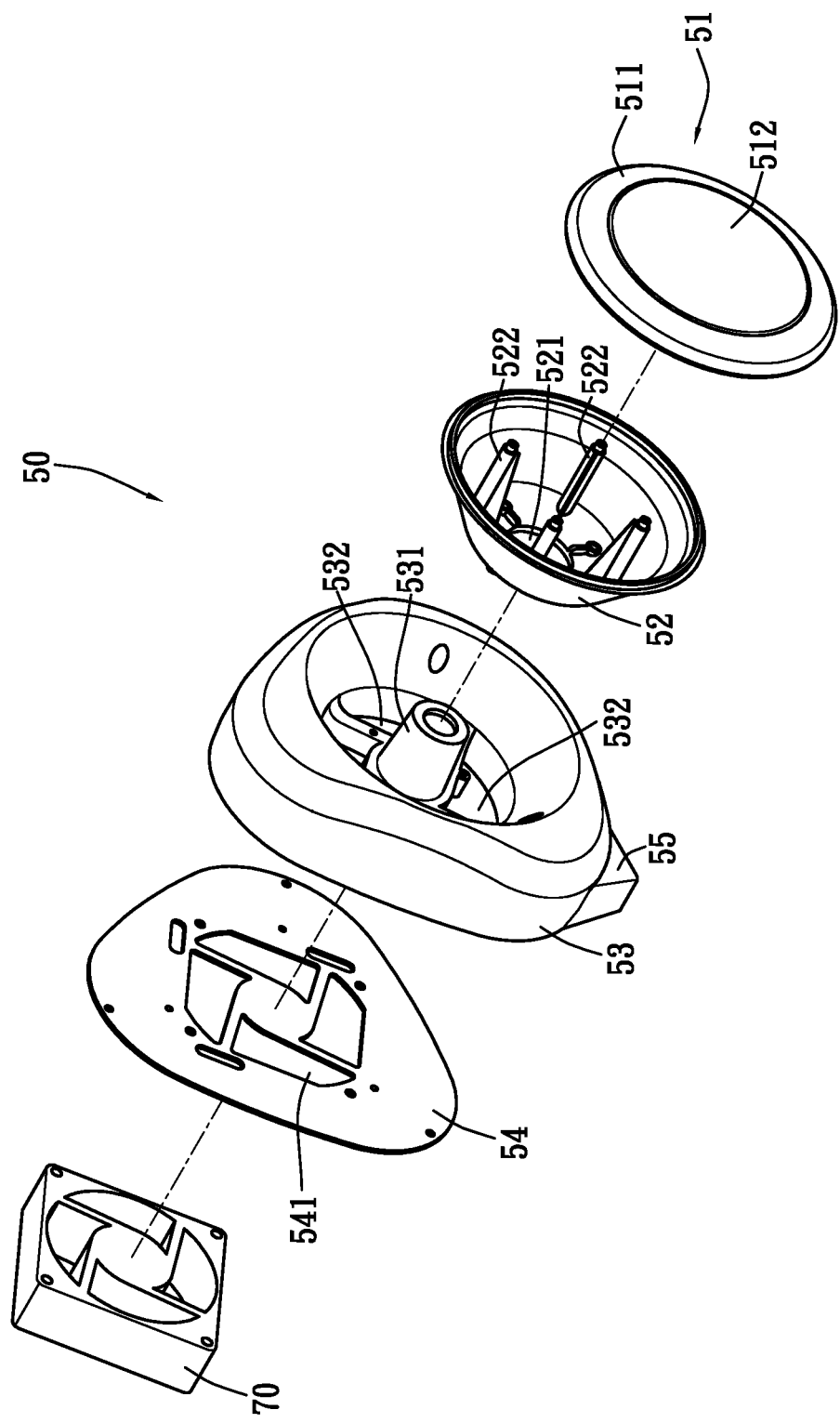
FIG. 3 is an explosion view of the air outlet assembly of the present invention.
Figure 4:
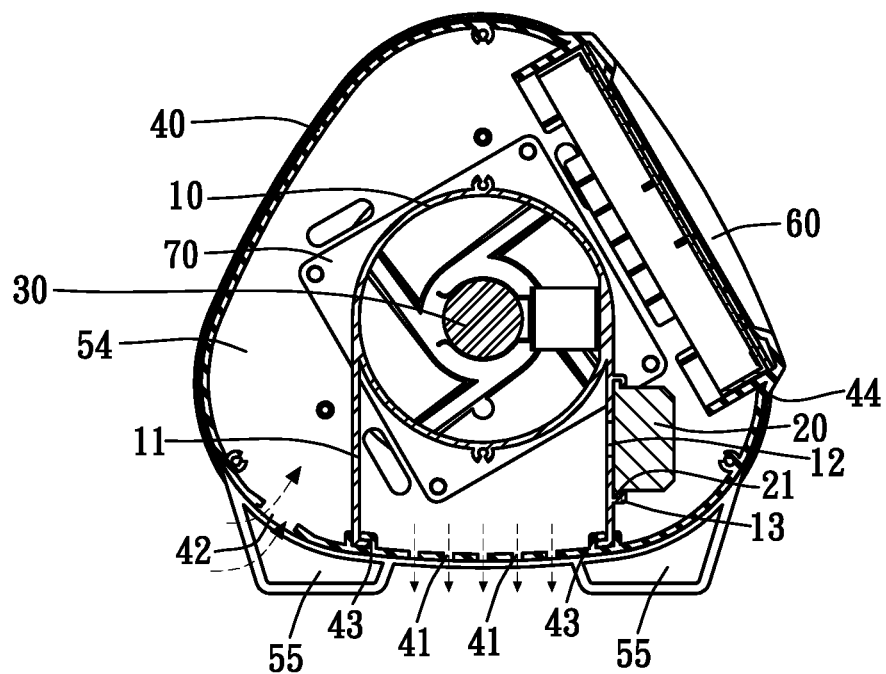
FIG. 4 is a schematic side face cross-section view of the present invention.
Figure 5:
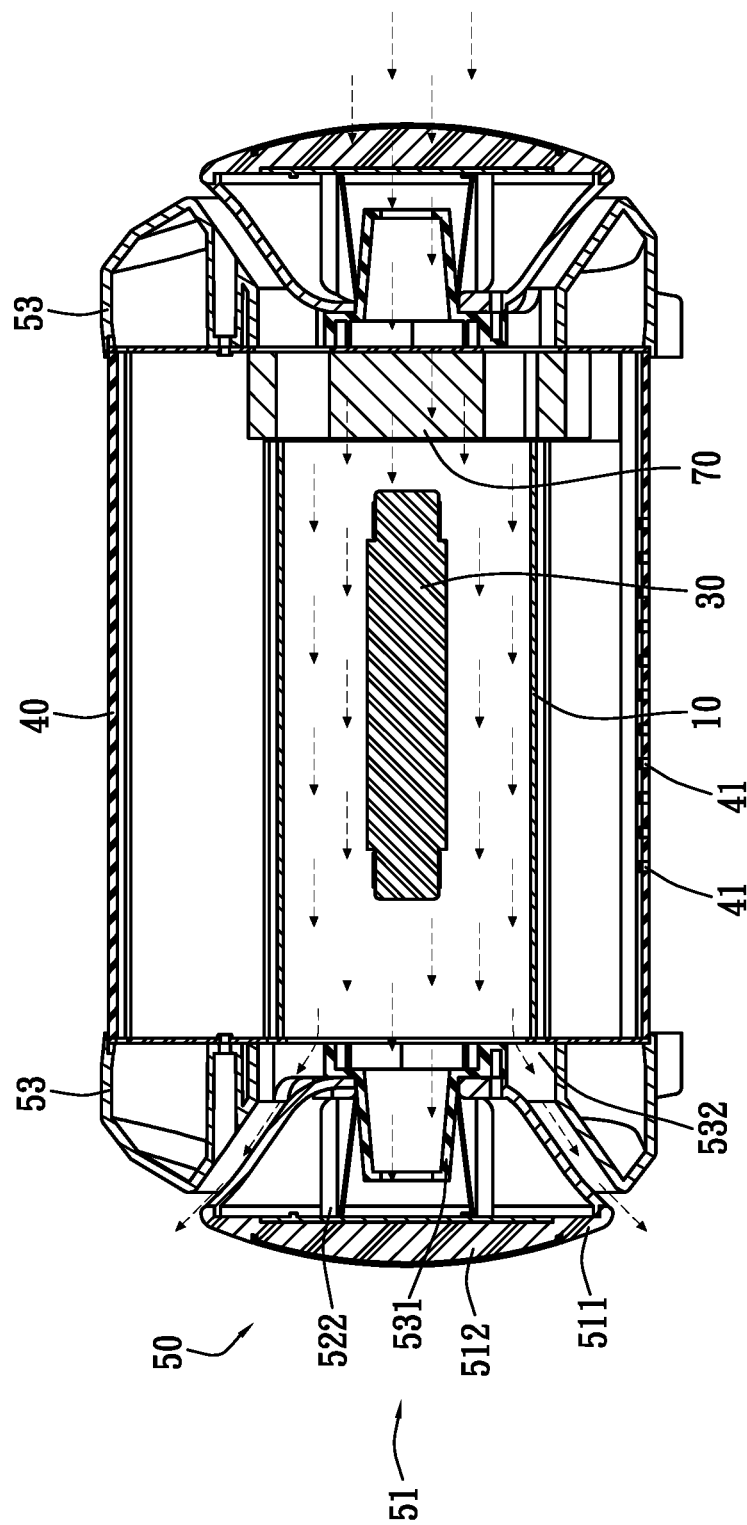
FIG. 5 is a schematic diagram of the air flowing of the present invention.

With reference to FIGS. 1 to 5, FIGS. 1 to 5 are schematics of an embodiment of the present invention. The air cleaning machine of the present invention is mainly applied to an indoor space or an enclosed space and the like, so that an effect of decreasing the concentration of the suspended particles (PM2.5) in the air, the air in the indoor space or enclosed space can be purified to satisfy the standard, so as to protect people stay in the indoor space or enclosed space.

Referring to the air cleaning machine of the present invention, the shape of air cleaning machine is triangular-shaped (it can also be another shape, which is not limited by the figures of the present invention), which mainly comprises a hollow tube body 10, a detect chip 20, an adsorbent material 30, a large shell body 40 and two air outlet assemblies 50. Specifically, the hollow tube body 10 has an accommodating space, and the adsorbent material 30 is disposed in the accommodating space of the hollow tube body 10, the concentration of suspended particles (PM2.5) in the air can be decreased through the adsorbent material 30. The two sides of the hollow tube body 10 are each extended a fixing sheet 11, and an air hole 12 is disposed on the one side of the fixing sheet 11. The shape of the air hole 12 is round (it also can be another shape). In addition, the fixing sheet 11 of one side of the hollow tube body 10 configures two relatively L-Shape strips 13 disposed on the outside, wherein the length of the two relatively L-Shape strips 13 is equal to the length of the hollow tube body 10.

In addition, the detect chip 20 further forms a side wing 21 extended from the two sides of the detect chip 20, the side wings 21 of the detect chip 20 is provided for combining with the two relatively L-Shape strips 13 of the fixing sheet 11 of the hollow tube body 10. Specifically, the width between two relatively L-Shape strips 13 is corresponding to the width of the detect chip 20, so the side wing 21 of the detect chip 20 can slide into the two relatively L-Shape strips 13 of the fixing sheet 11 of the hollow tube body 10, so as to be arranged closely the air hole 12 of the fixing sheet 11 of one side of the hollow tube body 10. As the result, the detect chip can detect the concentration of the suspended particles (PM2.5) in the air via the air hole 12.

In addition, the hollow tube body 10, the detect chip 20 and the adsorbent material are covered in the large shell body 40. Specifically, two ends of the large shell body 40 being open, a plurality of holes 41 being disposed on an underside of the large shell body 40, and a round hole 42 is disposed on the side of the large shell body 40, the air circulation is formed through a plurality of holes 41 disposed on an underside of the large shell body 40 and a round hole 42 disposed on the side of the large shell body 40. As the result, the air is able to flow via an air hole 12 disposed on the one side of the fixing sheet 11 of the hollow tube body 10. Thus, the detect chip 20 arranged closely to the air hole 12 of the fixing sheet 11 on one side of the hollow tube body 10 can detect the concentration of the suspended particles (PM2.5) in the air. In addition, the large shell body 40 is provided for configuring the hollow tube body 10 in the large shell body 40, the large shell body 40 configures two groove tracks 43 disposed on the inner side face, and the width between the two groove tracks 43 is corresponding to the width between the fixing sheets 11 on two sides of the hollow tube body 10, and the fixing sheets 11 on two sides of the hollow tube body form an inward bend on the lower side, so as to combine with the two groove tracks 43 on the inner side of the large shell body 40. As a result, the hollow tube body 10 can be detached and separated from the large shell body 40, so that the adsorbent material 30 disposed in the accommodating space of the hollow tube body 10 can be easily replaced.

In addition, the large shell body 40 mentioned above disposes a window hole 44 on the one side of the large shell body 40, and the window hole 44 configures a monitor 60. The monitor 60 configures a circuit board (not shown in Figures), which the circuit board is electrically connected to the detect chip 20, so the concentration of suspended particles (PM2.5) and the operation time detected by the detect chip 20 would be shown on the monitor 60.

In addition, two air outlet assemblies 50 are respectively set up on the open of the two ends of the large shell body 40, and one of the air outlet assembly 50 is combined with a fan 70, and one side of the fan 70 is attached to one end of the hollow tube body 10. In this way, the air flows through one of the air outlet assembly 50 to the hollow tube body 10 via the fan 70, and the suspended particles (PM2.5) in the air is absorbed through the adsorbent material 30, and then the air is blown out via the other air outlet assembly 50, so as to achieve an effect of purifying the air in the indoor space and to decrease the concentration of the suspended particles (PM2.5) in the air. In addition, the air outlet assembly 50 further disposes with a cover body 51, a concave cup 52, a shell body 53, and a side plate 54. The side plate 54 that disposed a plurality of air holes 541 is combined with the another face of the shell body 53, and the shell body 53 is concave and has a column body 531 extended from the center of the shell body 53, and a plurality of air outlet 532 are disposed around the column body 531. In addition, a round hole 521 is disposed on the bottom of the concave cup 52, and the column body 531 of the shell body 53 is configured through the round hole 521 disposed on the bottom of the concave cup 52, so as to combine with the shell body 53. In addition, a supporting leg body 55 is disposed on the lower side of the shell body 53, which is provided for being placing on the ground or the desktop. In addition, the cover body 51 is combined with the concave cup 52.

In addition, the concave cup 52 mentioned above comprises a fixing column 522 extended from the inside of the concave cup 52, and the cover body 51 comprises an external ring body 51 and an interior net cover body 512 that is combined with the external ring body 51. In addition, the external ring body 511 of the cover body 52 is combined with the fixing column 522 extended from the inside of the concave cup 52. In this way, the air can flow in or flow out through the interior net cover body 512, and the larger suspended particles would be blocked via the interior net cover body 512.

As can be appreciated from the above embodiments, a person skilled in the art can achieve the above object. Therefore, the present innovation patent has industry worth which meets the requirement for a patent, so that the application is submitted.

However, the above description should be considered as only the discussion of the preferred embodiments of the present innovation patent, and the claims of the present innovation patent is not limited to this. A person skilled in the art may make various modifications to the present innovation patent. Those modifications still fall within the spirit and scope defined by the appended claims.

What is claimed is:

1. An air cleaning machine comprising:
    a hollow tube body having an accommodating space, two sides of the hollow tube body each extended a fixing sheet, and an air hole being disposed on one of the fixing sheets;
    a detect chip being arranged closely to the air hole of the fixing sheet on one side of the hollow tube body;
    an adsorbent material being disposed in the accommodating space of the hollow tube body;
    a large shell body, being provided for configuring the hollow tube body in the large shell body, two ends of the large shell body being open, a plurality of holes being disposed on an underside of the large shell body, and a round hole being disposed on the side of the large shell body; and two air outlet assemblies being respectively set up on the open side of the two ends of the large shell body, and one of the air outlet assembly being combined with a fan, and one side of the fan being attached to one end of the hollow tube body.

2. The air cleaning machine as claimed in claim 1, wherein the large shell body further configures two groove tracks disposed on the inner side face, and the width between the two groove tracks is corresponding to the width between the fixing sheets on two sides of the hollow tube body, and the fixing sheets on two sides of the hollow tube body further forms an inward bend on the lower side, so as to combine with the two groove tracks on the inner side of the large shell body.

3. The air cleaning machine as claimed in claim 2, wherein the fixing sheet of one side of the hollow tube body further configures two relatively L-Shape strips disposed on the outside, and the width between the two groove tracks is corresponding to the width between the fixing sheets on two sides of the hollow tube body, and the detect chip further has a side wing extending from the two sides, the side wings of the detect chip are provided for combining with the two relatively L-Shape strips of the fixing sheets of the hollow tube body.

4. The air cleaning machine as claimed in claim 1, wherein the large shell body further dispose a window hole on one side of the large shell body, and the window hole further configures a monitor.

5. The air cleaning machine as claimed in claim 1, wherein each air outlet assembly is further disposed with a cover body, a concave cup, an outlet shell body, and a side plate, the side plate having a plurality of air holes is combined with the other face of the outlet shell body, and the outlet shell body is concave and has a column body extended from the center of the outlet shell body, and a plurality of air outlets are disposed around the column body, a round hole is disposed on the bottom of the concave cup, and the column body of the outlet shell body is configured through the round hole disposed on the bottom of the concave cup for combining with the outlet shell body, and the cover body is combined with the concave cup.

6. The air cleaning machine as claimed in claim 5, wherein the concave cup further comprises a fixing column extended from the inside of the concave cup, and the cover body further comprises an external ring body and an interior net cover body that is combined with the external ring body, and the external ring body of the cover body is combined with the fixing column extended from the inside of the concave cup.

7. The air cleaning machine as claimed in claim 5, wherein each air outlet assembly further has a supporting leg body on a lower side of the outlet shell body.

\* \* \* \* \*